United States Patent
Gorges et al.

(10) Patent No.: US 7,853,061 B2
(45) Date of Patent: Dec. 14, 2010

(54) SYSTEM AND METHOD TO IMPROVE VISIBILITY OF AN OBJECT IN AN IMAGED SUBJECT

(75) Inventors: Sebastien Gorges, Nancy (FR); Yves L. Trousset, Palaiseau (FR); Jeremie Pescatore, Yvelines (FR); Vincent Bismuth, Paris (FR); Marie-Odile Berger, Maron (FR); Erwan Kerrien, Nancy (FR)

(73) Assignee: General Electric Company, Schenectady, NY (US)

( * ) Notice: Subject to any disclaimer, the term of this patent is extended or adjusted under 35 U.S.C. 154(b) by 901 days.

(21) Appl. No.: 11/740,734

(22) Filed: Apr. 26, 2007

(65) Prior Publication Data

US 2008/0267490 A1    Oct. 30, 2008

(51) Int. Cl.
G06K 9/00 (2006.01)
A61B 6/02 (2006.01)
G21K 4/00 (2006.01)

(52) U.S. Cl. .......................... 382/128; 378/42; 378/190

(58) Field of Classification Search ................. 382/128, 382/129, 130, 131, 132, 133, 134, 151, 154, 382/255, 294; 378/4, 8, 21, 27, 95, 98.11, 378/98.12, 101, 901; 600/407, 424, 431, 600/458; 128/916
See application file for complete search history.

(56) References Cited

U.S. PATENT DOCUMENTS

| 4,984,160 A | 1/1991 | Saint Felix et al. |
| 5,095,521 A | 3/1992 | Trousset et al. |
| 5,218,534 A | 6/1993 | Trousset et al. |
| 5,253,171 A | 10/1993 | Hsiao et al. |
| 5,287,274 A | 2/1994 | Saint Felix et al. |
| 5,442,674 A | 8/1995 | Picard et al. |

(Continued)

FOREIGN PATENT DOCUMENTS

WO          03084380          10/2003

(Continued)

OTHER PUBLICATIONS

Straka et a.., The VesselGlyph: Focus & Context Visualization in CT-Angiography, Visualization 2004, pp. 385-374, XP010903124.

(Continued)

*Primary Examiner*—Abolfazl Tabatabai

(57) ABSTRACT

A system to track movement of an object travelling through an imaged subject is provided. The system includes an imaging system to acquire a fluoroscopic image and operable to create a three-dimensional model of a region of interest of the imaged subject. A controller includes computer-readable program instructions representative of the steps of calculating a probability that an acquired image data is of the object on a per pixel basis in the fluoroscopic image, calculating a value of a blending coefficient per pixel of the fluoroscopic image dependent on the probability, adjusting the fluoroscopic image including multiplying the value of the blending coefficient with one of a greyscale value, a contrast value, and an intensity value for each pixel of the fluoroscopic image. The adjusted fluoroscopic image is combined with the three-dimensional model to create an output image illustrative of the object in spatial relation to the three-dimensional model.

20 Claims, 4 Drawing Sheets

U.S. PATENT DOCUMENTS

| | | | |
|---|---|---|---|
| 5,930,384 A | 7/1999 | Guillemaud et al. | |
| 6,224,257 B1 | 5/2001 | Launay et al. | |
| 6,314,313 B1 | 11/2001 | Romeas et al. | |
| 6,404,843 B1 * | 6/2002 | Vaillant | 378/8 |
| 6,466,638 B1 | 10/2002 | Silver et al. | |
| 6,643,392 B1 | 4/2003 | Vaillant et al. | |
| 6,711,433 B1 * | 3/2004 | Geiger et al. | 600/431 |
| 6,714,668 B1 | 3/2004 | Kerrien et al. | |
| 6,766,048 B1 | 7/2004 | Launay et al. | |
| 6,834,096 B2 * | 12/2004 | Launay et al. | 378/8 |
| 7,066,646 B2 | 6/2006 | Pescatore et al. | |
| 7,113,631 B2 | 9/2006 | Vaillant et al. | |
| 7,123,255 B2 | 10/2006 | Trousett et al. | |
| 7,123,682 B2 * | 10/2006 | Kotian et al. | 378/21 |
| 7,170,533 B2 | 1/2007 | Launay et al. | |
| 6,854,884 B2 | 4/2007 | Kerrien et al. | |
| 2001/0053204 A1 | 12/2001 | Navab et al. | |
| 2004/0202288 A1 | 10/2004 | Pescatore et al. | |
| 2005/0047679 A1 | 3/2005 | Riddell et al. | |
| 2005/0111719 A1 | 5/2005 | Pescatore et al. | |
| 2005/0119565 A1 | 6/2005 | Pescatore | |
| 2005/0278711 A1 | 12/2005 | Silva et al. | |
| 2006/0262966 A1 | 11/2006 | Eck et al. | |
| 2007/0071341 A1 | 3/2007 | Pfister | |

FOREIGN PATENT DOCUMENTS

| | | |
|---|---|---|
| WO | 2006056909 | 6/2006 |

OTHER PUBLICATIONS

Kerrien et al., "Machine precision assessment for 3D/2D digital subtracted angiography images registration", Proc. SPIE, vol. 3338, Feb. 1998, pp. 39-49.

Canero et al., "Modeling the Acquisition Geometry of a C-Arm Angiography System for 3D Reconstruction", CCIA 2002, LNAI 2504, pp. 322-355.

Mitschke et al., "Optimal configuration for dynamic calibration of projection geometry of X-ray C-arm systems", IEEE 2000.

S. Gorges et al., "3d Augmented Fluoroscopy in Interventional Neuroradiology: Precision Assessment and First Evaluation on Clinical Cases", In Workshop AMI-ARCS 2006 held in conjuction with MICCAI'06, Oct. 2006, Copenhagen, Denmark.

Freeman and Adelson, "The Design and Use of Sterrable Filters", IEEE trans. Patt. Anal. And Machine Intell., vol. 13, No. 9, pp. 891-906, Sep. 1991.

* cited by examiner

SYSTEM AND METHOD TO IMPROVE VISIBILITY OF AN OBJECT IN AN IMAGED SUBJECT

BACKGROUND OF THE INVENTION

The subject matter described herein generally relates medical imaging, and in particular to a system and method to guide movement of an instrument or tool through an imaged subject.

Fluoroscopic imaging generally includes acquiring low-dose radiological images of anatomical structures such as the arteries enhanced by injecting a radio-opaque contrast agent into the imaged subject. The acquired fluoroscopic images allow acquisition and illustration of real-time movement of high-contrast materials (e.g., tools, bones, etc.) located in the region of interest of the imaged subject. However, the anatomical structure of the vascular system of the imaged subject is generally not clearly illustrated except for that portion with the injected contrast medium flowing through. There is a need for an imaging system with enhanced visibility of the object (e.g., surgical tools, catheters, etc.) travelling through the imaged subject relative to surrounding superimposed imaging anatomical structures. There is also a need for a system and method of imaging with enhanced captured image details of objects travelling through the imaged subject, so as allow reduction of a volume of contrast medium injected into the imaged subject.

BRIEF DESCRIPTION OF THE INVENTION

The above-mentioned need is addressed by the embodiments described herein in the following description.

According to one embodiment, a system to track movement of an object travelling through an imaged subject is provided. The system includes a fluoroscopic imaging system operable to acquire a fluoroscopic image of the object within a region of interest of the imaged subject, an imaging system operable to create a three-dimensional model of the region of interest of the imaged subject, and a controller comprising a memory operable to store a plurality of computer-readable program instructions for execution by a processor. The plurality of program instructions are representative of the steps of a) calculating a probability that an acquired image data is of the object, the calculating step performed per pixel in the fluoroscopic image; b) calculating a value of a blending coefficient per pixel of the fluoroscopic image dependent on the probability calculated in step (a); c) creating an output image comprising the fluoroscopic image and the three-dimensional model, the step of creating including blending the fluoroscopic image and the three-dimensional model according to the blending coefficient of step (b).

According to another embodiment, a method to track movement of an object travelling through an imaged subject is provided. The method includes the steps of a) calculating a probability that an acquired image data is of the object, the calculating step performed per pixel in a fluoroscopic image of the imaged subject; b) calculating a value of a blending coefficient per pixel of the fluoroscopic image dependent on the probability calculated in step (a); c) creating an output image comprising the fluoroscopic image and the three-dimensional model, the step of creating including blending the fluoroscopic image and the three-dimensional model according to the blending coefficient of step (b).

An embodiment of a system to track movement of an object through an imaged subject is also provided. The system includes a fluoroscopic imaging system operable to acquire a fluoroscopic image of the object within a region of interest of the imaged subject; an imaging system operable to create a three-dimensional model of the region of interest of the imaged subject; and a controller comprising a memory operable to store a plurality of computer-readable program instructions for execution by a processor. The plurality of program instructions are representative of the steps of a) calculating a probability that an acquired image data is of the object, the calculating step performed per pixel in the fluoroscopic image, b) registering the fluoroscopic image and the three-dimensional of the region of the interest in spatial relation to a common coordinate system, c) calculating a value of a transparency per pixel of the three-dimensional model dependent on the probability per respective pixel of the fluoroscopic image as calculated in step (a), d) adjusting the three-dimensional according to the value of transparency per pixel of step (c), and d) combining the fluoroscopic image with the three-dimensional model adjusted according to step (c) to create an output image illustrative of the object in spatial relation to the three-dimensional model.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
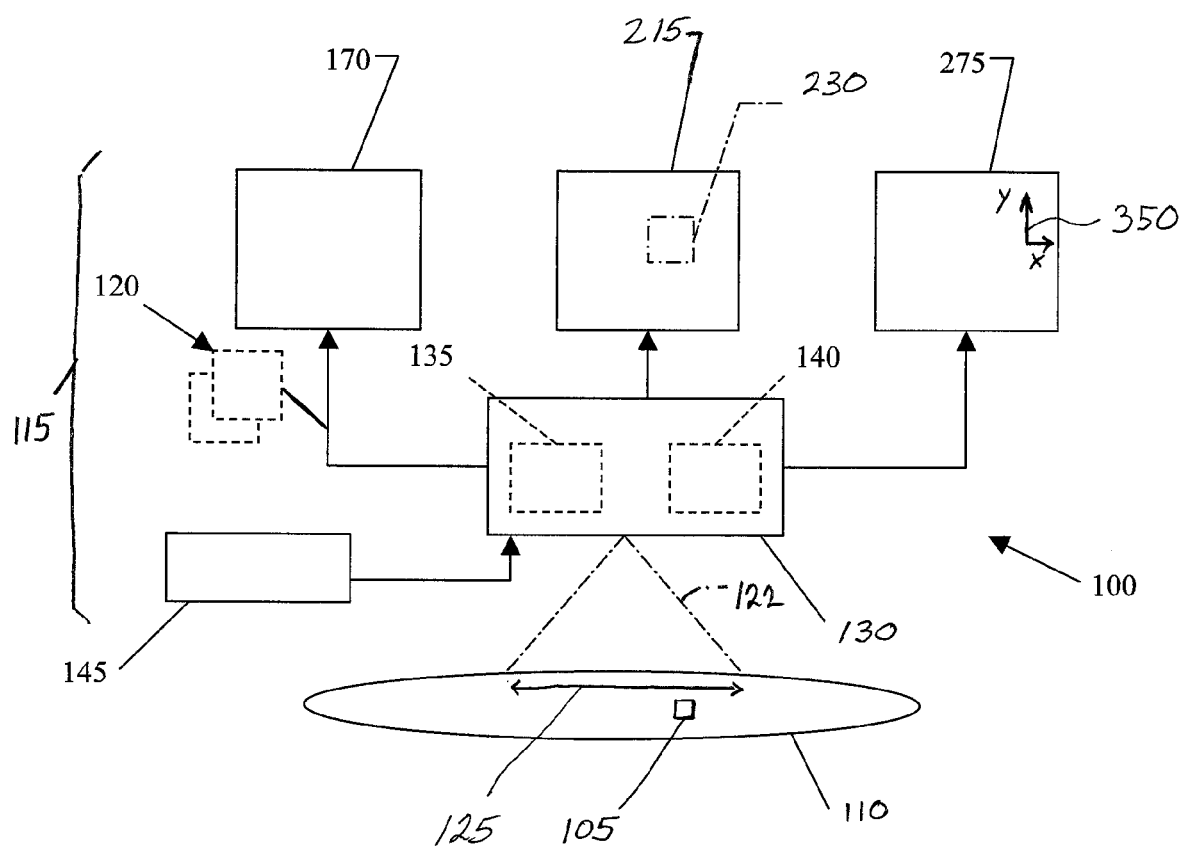
FIG. 1 is a schematic diagram illustrative of an embodiment of a system to track movement of an object through an imaged subject.

FIG. 1 illustrates an embodiment of a system 100 to track movement or navigation of an image-guided object or tool 105 through an imaged subject 110. The system 100 comprises an imaging system 115 operable to acquire an image or a sequence of images or image frames 120 (e.g., x-ray image, fluoroscopic image, magnetic resonance image, real-time endoscopic image, etc. or combination thereof) illustrative of the location of the object 105 in the imaged subject 110. Thus, it should be understood that reference to the image 120 can include one or a sequence of images or image frames.

One embodiment of the image-guided object or structure 105 includes a catheter or guidewire configured to deploy a stent at a desired position in a vascular vessel structure of the imaged subject 110.

The imaging system 115 is generally operable to generate a two-dimensional, three-dimensional, or four-dimensional image data corresponding to an area of interest of the imaged subject 110. The type of imaging system 115 can include, but is not limited to, computed tomography (CT), magnetic resonance imaging (MRI), x-ray, positron emission tomography (PET), ultrasound, angiographic, fluoroscopic, and the like or combination thereof. The imaging system 115 can be of the type operable to generate static images acquired by static imaging detectors (e.g., CT systems, MRI systems, etc.) prior to a medical procedure, or of the type operable to acquire real-time images with real-time imaging detectors (e.g., angioplastic systems, laparoscopic systems, endoscopic systems, etc.) during the medical procedure. Thus, the types of images can be diagnostic or interventional. One embodiment of the imaging system 115 includes a static image acquiring system in combination with a real-time image acquiring system. Another embodiment of the imaging system 115 is configured to generate a fusion of an image acquired by a CT imaging system with an image acquired by an MR imaging system. This embodiment can be employed in the surgical removal of tumors.

One example of the imaging system 115 generally includes a fluoroscopic imaging system having an energy source projecting energy (e.g., x-rays) 122 through the imaged subject 110 to be received at a detector in a conventional manner. The energy is attenuated as it passes through imaged subject 110, until impinging upon the detector, generating the image or image frames 120 illustrative of a region of interest 125 of the imaged subject 110. This example of the imaging system 115 also includes a software product or package operable to combine a series of acquired images (e.g., CT type images) to generate a three-dimensional, reconstructed image or model 170 representative of the internal structure or organs of interest. An embodiment of the software product operable to create the reconstructed three-dimensional image is INNOVA® 3D as manufactured by GENERAL ELECTRIC®. The software product is also operable to measure a volume, a diameter, and a general morphology of a vessel (e.g., vein, artery, etc.) or other anatomical structures.

The image or sequence of acquired image frames 120 is digitized and communicated to a controller 130 for recording and storage in a memory 135. The controller 130 further includes a processor 140 operable to execute the programmable instructions stored in the memory 135 of the system 100. The programmable instructions are generally configured to instruct the processor 140 to perform image processing on the sequence of acquired images or image frames 120 for illustration on a display. One embodiment of the memory 135 includes a hard-drive of a computer integrated with the system 100. The memory 135 can also include a computer readable storage medium such as a floppy disk, CD, DVD, etc. or combination thereof known in the art.

Having generally provided the above-description of the construction of the system 100, the following is a discussion of a method 200 of operating the system 100 to navigate or track movement of the object 105 through the imaged subject 110. It should be understood that the following discussion may discuss acts or steps not required to operate the system 100, and also that operation can include additional steps not described herein. An embodiment of the acts or steps can be in the form of a series of computer-readable program instructions stored in the memory 135 for execution by the processor 140 of the controller 130. A technical effect of the system 100 and method 200 is to enhance visualization of the object 105 relative to other illustrated features of the superimposed, three-dimensional model of the region of interest of the imaged subject 110. More specifically, a technical effect of the system 100 and method 200 is to enhance illustration of the object 105 without sacrificing contrast in illustration of the three-dimensional reconstructed image or model 170 of anatomical structure in the region of interest 125 of the imaged subject 110.

Figure 2:
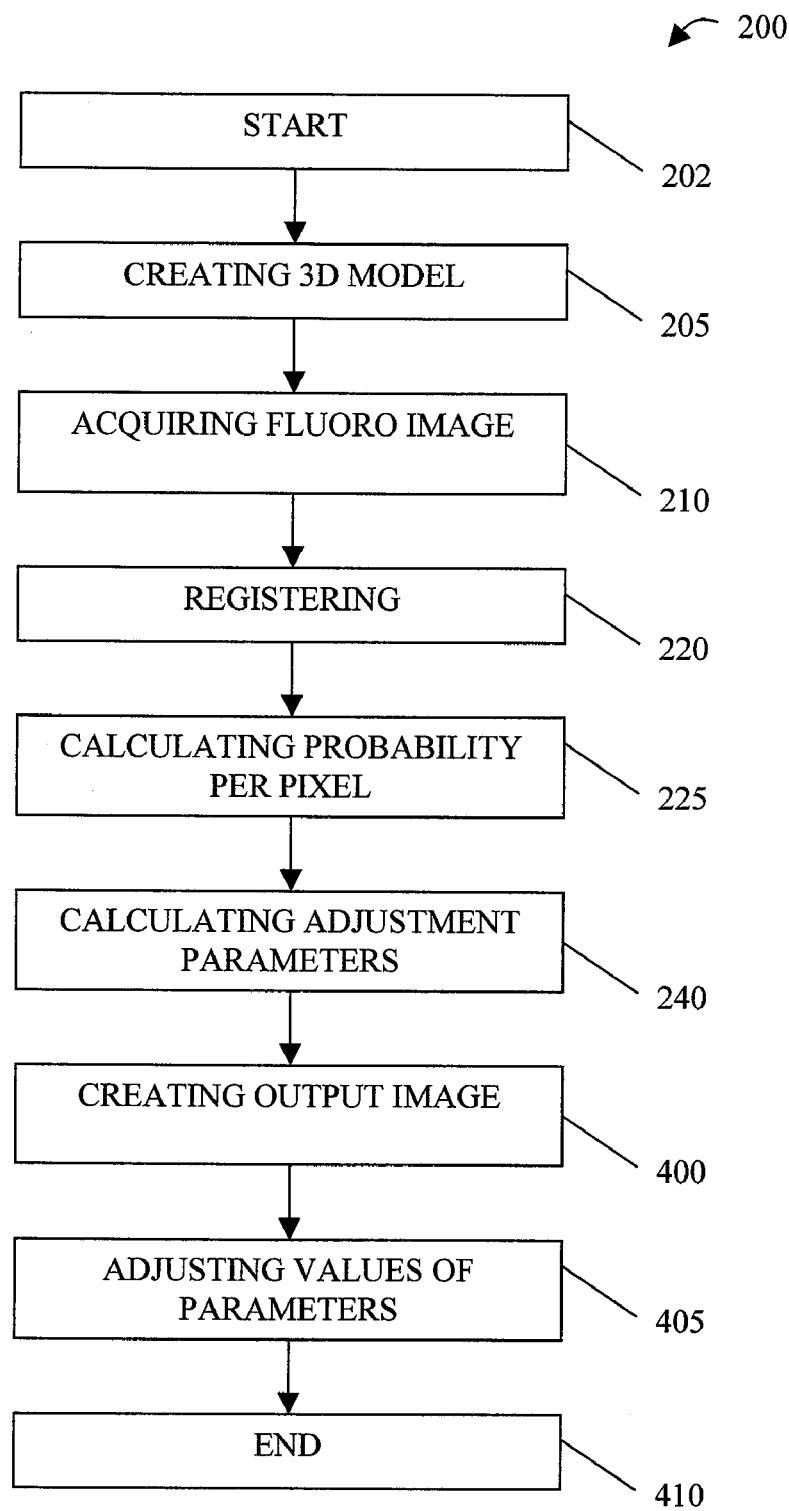
FIG. 2 is a schematic illustration of an embodiment of a method of tracking movement of the object through an imaged subject using the system of FIG. 1.

Referring now to FIG. 2, step 202 is the start. Step 205 includes generating or creating the three-dimensional reconstructed model 170 of the region of interest 125 from the series of acquired images 120. An example of the three-dimensional model is a dual-energy x-ray absorptiotiometry (DXA) model generated by a LUNAR IDXA™ as manufactured by GENERAL ELECTRIC® Healthcare in the diagnosis of monitoring of bone density disease.

Step 210 includes acquiring a two-dimensional, low-radiation dose, fluoroscopic image 215 with the imaging system 115 in a conventional manner of the imaged subject 110. An injected contrast agent can be used to enhance the image 215, but is not necessary with the system 100 and method 200 disclosed herein. Step 220 includes registering the fluoroscopic image 215 for later combination, fusion, or placement in superimposition with the three-dimensional model 170 according to a common reference or coordinate system 222.

It should be understood that the source (CT imaging system, fluoroscopic imaging system, picture archival system (PACs), MRI, PET, ultrasound, etc.) of the three-dimensional model 170 and/or fluoroscopic image 215 can vary.

Step 225 includes identifying or detecting the pixels in the fluoroscopic image 215 having increased likelihood or probability of corresponding or correlating to including image data of the object 105. An embodiment of step 225 includes calculating a probability that an acquired image data is of the object 105 on a per pixel basis for at least a portion or all of the fluoroscopic image 215. An embodiment of calculating the probability can include applying a dilation technique to the fluoroscopic image 215 so as to increase a dimension or size of the imaged object 105 illustrated therein. For example, the object 105 can include a very thin wire that is difficult or too small to identify following superimposition of the fluoroscopic image with the three-dimensional model. To increase the contrast of the object 105, candidate pixels suspected to include image data of the object 105 can be dilated using known techniques of mathematical morphology so as to increase a size of the illustration of the imaged object 105 as captured in the fluoroscopic image 215.

Another embodiment of the step 225 of calculating the probability per pixel includes comparing image data per pixel to predetermined or stored or calibrated image data correlated to the object 105. Another embodiment of step 225 can include calculating the probability on a per pixel basis dependent on or correlated to tracking data of the object 105 as acquired by a navigation system in a known manner. Another embodiment of step 225 includes identifying a target region 230 having a series of pixels calculated within a predetermined range of probability of including image data of the object 105. Step 225 can also include applying a steerable filter or oriented filters in a known manner to reduce noise in the target region 230 of the fluoroscopic image 215. Calculation of the probability per pixel can be updated periodically or continuously with periodic or continuous updates of the fluoroscopic image 215 in real-time with movement of the object 105 through the imaged subject 110.

Step 240 includes calculating image adjustment parameters as a function of measured values of the pixelated data (e.g., greyscale value) detected in target region of the fluoroscopic image 215. Examples of image adjustment parameters include rendering, projection, or blending parameters associated with superimposition, combining, or fusion of the three-dimensional reconstructed image or model 170 with the fluoroscopic image 215 of the object 105 so as to enhance illustration of the target region 230 of the fluoroscopic image 215 without reducing detailed illustration of the anatomical structures in the three-dimensional model 170.

There are several projection parameters that may be identified or altered so as to adjust fusion, superimposition, or combination of fluoroscopic image 215 and the three-dimensional model 170. The projection parameters can depend on the desired information to be highlighted according to image analysis or input from the user. An example of a projection parameter is a level of transparency of the pixels comprising the fluoroscopic image 215 and the three-dimensional model 170 relative to the other in their superposition or fusion with one another to create an output image 275.

An embodiment of step 240 includes calculating a level or degree of transparency of the three-dimensional model 170 relative to the fluoroscopic image 215 on a per pixel basis dependent on the calculated probabilities. An embodiment of calculating the degree of transparency generally includes calculating a proportion of a value of light transmission relative to or dependent upon a calculated probability of the associated pixel including image data of the object as calculated in step 225. The degree of transparency of each pixel is calculated dependent upon the probability of including image data of the object 105 so as to cause illustration of the surrounding anatomical structures in the three-dimensional model 170 to be more transparent in the combined output image 275. According to an embodiment of calculating the transparency of a pixel by pixel basis includes increasing a value of opacity or contrast or light intensity of each pixel in proportion with an increased probability of including captured image data of the walls of the anatomical structures surrounding the object 105 relative to pixels with image data of either side of the anatomical structural walls (e.g., internalized structures).

Figure 3:
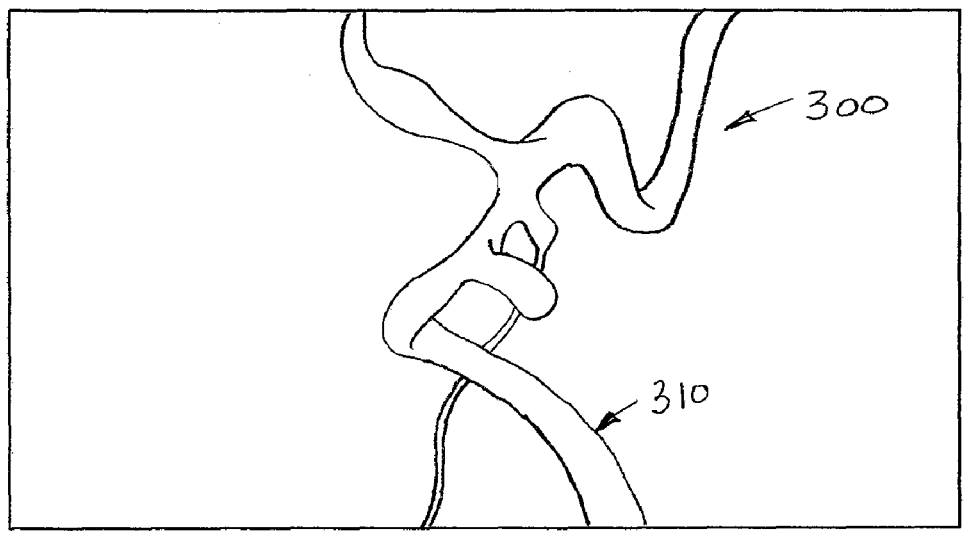
FIG. 3 illustrates an embodiment of a three-dimensional model generated with about a zero value of transparency.
Figure 4:
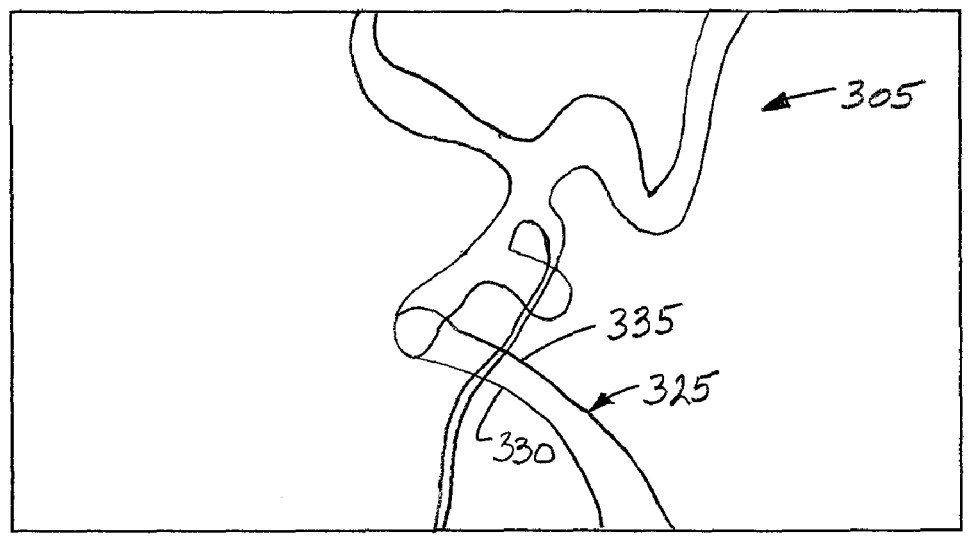
FIG. 4 illustrates an embodiment of a three-dimensional model generated with an increased value of transparency relative to FIG. 3.

FIGS. 3 and 4 illustrate embodiments of an influence of adjusting the transparency parameter for a three-dimensional model 300 and 305, respectively, similar to the three-dimensional model 170 described above. FIG. 3 illustrates an embodiment of the three-dimensional reconstructed image or model 300 with the rendering parameter selected or set to about zero percent transparency, referred to as a surface rendering, so that a surface of the anatomical structure 310 is displayed rather than then internalized structures located therein. In contrast, FIG. 4 illustrates the three-dimensional reconstructed model 305 with the rendering parameter selected or set to an increased transparency, relative to model 300 of FIG. 3, such that the illustration of a surface of the anatomical structure 325 is more transparent (e.g., seventy percent transparency) so as to illustrate detailed imaged data of the internalized structure located therein or lack thereof. In the illustrated example, the value of transparency of the pixels that illustrate image data of the walls 330 and 335 of the structure 325 is lower relative to value of transparency of the pixels that illustrate image data on either side of the walls 330 and 335.

An embodiment of calculating or adjusting a blending parameter according to step 240 includes calculating a value of a blending parameter on a per pixel basis to one or both the fluoroscopic image 215 and the three-dimensional reconstructed model 170. The blending parameter or factor generally specifies what proportion of each component (e.g., the fluoroscopic image 215 and the three-dimensional reconstructed model 170) to be superimposed or fused relative to the other in creating the output image 275. An embodiment of a blending technique in applying the blending factor to the superposition or fusion of the fluoroscopic image 215 with the three-dimensional reconstructed image or model 170 includes identifying or selecting a blending factor or coefficient that proportions (e.g., linearly, exponentially, etc.) the superposition or fusion of the fluoroscopic image 215 with the three-dimensional reconstructed image or model 170. An embodiment of a linear blending technique is according to the following mathematical representation or formula:

$$\text{Fused\_image} = (\text{alpha factor}) * (\text{target region of the fluoro\_image}) + (1 - \text{alpha factor}) * (\text{three-dimensional reconstructed image or model}),$$

where the alpha factor is a first blending coefficient to be multiplied with the measured greyscale, contrast or intensity value for each pixel in the target region 230 of the fluoroscopic image 215, and the (1−alpha factor) is a second blending coefficient to be multiplied with the measured greyscale, contrast, or intensity value for each pixel of the three-dimensional reconstructed model 170 outside the superimposed, fused, or combined target region 230 of the fluoroscopic image 215. According to another embodiment of the alpha technique, the above mathematical representation or formula can further include another blending coefficient (i.e., gamma) equal to about zero that is multiplied with a greyscale, contrast, or intensity value for every pixel in the three-dimensional model 170 that is not associated with an anatomical structure or otherwise an anatomical structure of interest.

Another example of the blending technique can include more blending factors or coefficients, as shown in the following mathematical representation:

$$\text{Fused\_image} = (\text{alpha factor}) * (\text{pixel value of fluoro\_image}) + (\text{beta factor}) * (\text{pixel value of anatomical 3D\_image}) + (\text{gamma factor}) * (\text{pixel value of non-anatomical 3D image}),$$

where the alpha factor, beta factor, and gamma factor are individually identified and selected as predetermined stored values in the memory 135 or received via the input 145.

According to one embodiment of step 240, each of the blending factors (e.g., alpha factor, beta factor, gamma factor, 1−alpha factor) described above is calculated per pixel having a particular x, y coordinate dependent on or in proportion to the calculated probability of the respective pixel including image data of the object 105 as described in step 225. One or more of the above-described blending factors is applied on a per pixel basis to adjust the target region image 230 of the image 215 or the model 170 as function according to a two- or three-dimensional coordinate system 222 identified in common reference to the three-dimensional reconstructed model 170 and/or in reference to the fluoroscopic image 215. This embodiment of step 240 can be represented by the following mathematical representation:

$$\text{alpha factor} = f(x, y),$$

where the alpha factor is a blending factor associated each pixel and dependent on or proportional to the calculated probability of the respective pixel including image data of the object 105 as described in step 225, and where (x) and (y) represent coordinates in the coordinate system 222 defining a common reference of a spatial relation of each pixel of the fluoroscopic image 215 and the three-dimensional reconstructed model 170 fused, superimposed, or combined to create the output image 275.

According to an example of this embodiment, step 240 includes identifying and applying a first blending factor alpha to calculate the greyscale, contrast, or intensity values of the pixels of the three-dimensional model 170 projecting in combination, fusion or superposition within the limits of the target region 230 of the fluoroscopic image 215 to create the output image 275. Step 240 further includes identifying and applying or multiplying a second blending factor (the second blending factor lower relative to the first blending factor) to calculate the greyscale, contrast, or intensity values per pixel of remaining pixels of the three-dimensional model 170 projecting outside the limits of the target region 230 and to the remainder of the fluoroscopic image 215. Different blending factors can applied to calculate the greyscale, contrast, or intensity values per pixel of the fluoroscopic image 215 relative to the remainder of the fluoroscopic image 215 in a similar manner. The step 240 can be performed periodically or continuously in real-time as the target region 230 of the fluoroscopic image 215 moves with the object 105 through the imaged subject 110.

Figure 5:
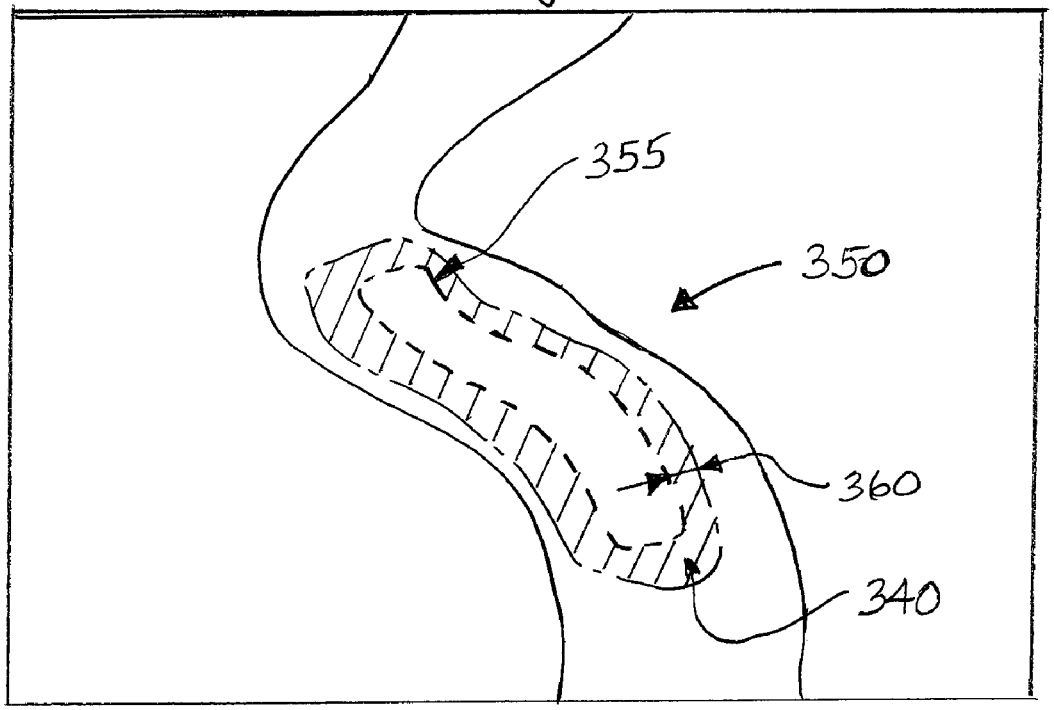
FIG. 5 illustrates an embodiment of a transition region of blending between a target region and the surrounding anatomical structures of a three-dimensional reconstructed model.
Figure 6:
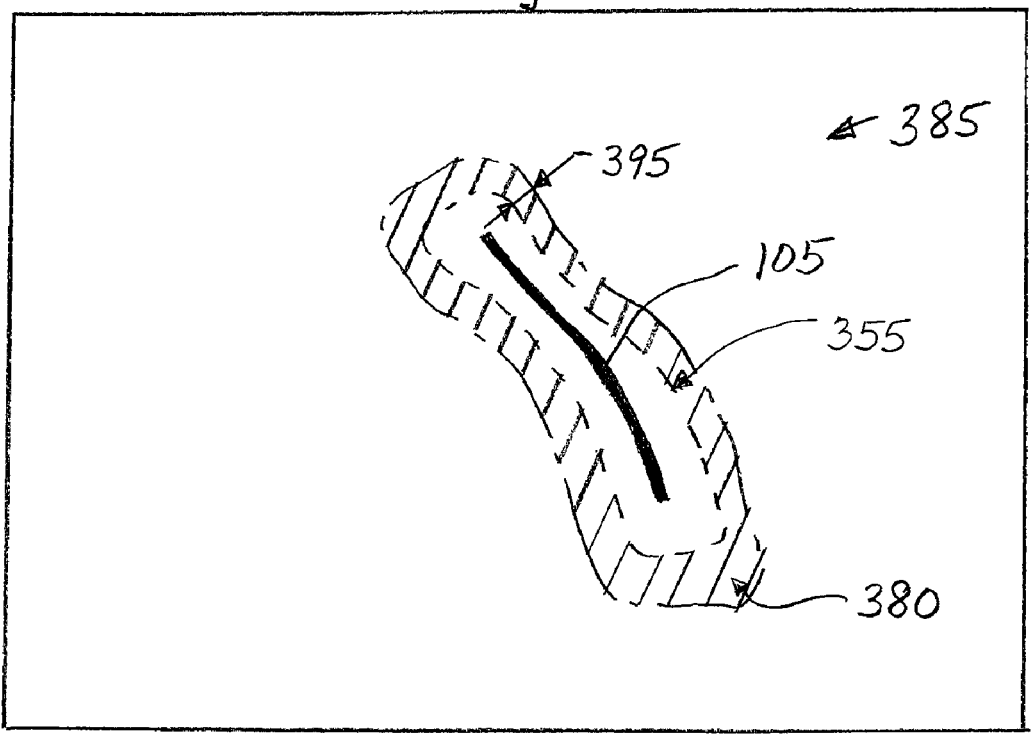
FIG. 6 illustrates an embodiment of a transition region of blending between a target region and the portion of a fluoroscopic image.

Referring now to FIG. 5, an embodiment of step 240 can further include identifying a model transition portion 340 (illustrated by cross-hatching) of a three-dimensional model 350, similar to the model 170 described above, extending between the pixels of the model 350 (e.g., within a target region 355 similar to the target region 230 described above) and the pixels of the model 350 at a spaced distance 360 outward from the target region 355. Another embodiment of the step 240 can include identifying a model transition portion 340 including a series of pixels located between a first pixel of a first location with coordinate x1, y1, and a second pixel of a second location with coordinate x2, y2. Step 240 can further include identifying and multiplying a first transitional blending algorithm to calculate the greyscale, contrast, or intensity values per pixel within the model transition portion 340. In a similar manner and as illustrated in FIG. 6, step 240 can also include identifying a fluoroscopic transition portion 380 (illustrated by cross-hatching) of a fluoroscopic image 385 (similar to the fluoroscopic image 215 described above) extending between pixels of a first and second coordinate, or alternatively the pixels within an analogous target region 390 and the remainder of pixels of the fluoroscopic image 385 at a spaced distance 395 outside the target region 390. The fluoroscopic transition portion 380 is generally similar in shape and size to the model transition portion 340 in FIG. 5. Step 240 can further include multiplying a transitional blending algorithm to calculate the greyscale, contrast, or intensity values per pixel in the fluoroscopic transition portion 380. Examples of the transitional blending algorithm can be a continuous linear change or transition, a stepped linear transition, or a continuous exponential change or transition in value between the first and second blending factors described above.

It should be understood that the target regions 230, 355 and 395 described above can vary in shape (e.g., window, polygram, envelope spaced at a constant distance from an outer surface of the object 105) in conformance with the shape of the object 105. Also, it should be understood that other known image processing techniques to vary projection of the fluoroscopic image 215 in superposition with the three-dimensional reconstructed model 170 can be used in combination with the system 100 and method 200 described above. Accordingly, the step 240 can include identifying and applying a combination of the above-described techniques in varying or adjusting values of projection parameters (e.g., transparency, intensity, opacity, blending) on a pixel by pixel basis or a coordinate basis (e.g., x-y coordinate system, polar coordinate system, etc.) in superimposing, fusing, or combining the fluoroscopic image 215 with the three-dimensional reconstructed model 170 of the surrounding anatomical structure.

Referring back to FIG. 2, step 400 includes combining, superimposing, or fusing the image data of at least a portion of the three-dimensional model 170 adjusted as described above in step 230 with the image data of at least a portion of the two-dimensional fluoroscopic image 215 adjusted as described in step 230 so to create the output image 275 illustrative of the object 105 in spatial relation to the reconstructed anatomical structures of the model 170. An embodiment of step 400 includes combining, fusing or superimposing the fluoroscopic image 215 with a two-dimensional, volume rendering illustration of the model 170. Step 405 includes re-adjusting the value of the image adjustment parameters (e.g., projection, rendering, etc.) as described above in step 240 until a desired detailed illustration of the object 105 and the surrounding anatomical structure of the model 170 is achieved. Step 405 can include adjusting values of the transparency or blending coefficients on a per pixel basis according to instructions received via the input 145.

Step 410 is the end.

A technical effect of the above-described method 200 and system 100 is to enhance illustration or increase contrast of both the object 105 as captured in the target region 230 of the fluoroscopic image 215 as well as illustration of the surrounding anatomical structure as generated in three-dimensional reconstructed image or model 170 in the process of fusing, superimposing, or combining the image 215 and model 170 together to create the output image 275. Another technical effect of the above-described method 200 and system 100 is to reduce or avoid the necessity of injecting a contrast agent into the imaged subject 110 to acquire visual image data of movement of the object 105 therethrough.

This written description uses examples to disclose the invention, including the best mode, and also to enable any person skilled in the art to make and use the invention. The scope of the subject matter described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system to track movement of an object travelling through an imaged subject, comprising:
    a fluoroscopic imaging system operable to acquire a fluoroscopic image of the object within a region of interest of the imaged subject;
    an imaging system operable to create a three-dimensional model of the region of interest of the imaged subject; and
    a controller comprising a memory operable to store a plurality of computer-readable program instructions for execution by a processor, the plurality of program instructions representative of the steps of:
    a) calculating a probability that an acquired image data is of the object, the calculating step performed per pixel in the fluoroscopic image,
    b) calculating a value of a blending coefficient per pixel of the fluoroscopic image dependent on the probability calculated in step (a), and
    c) creating an output image comprising at least a portion of the fluoroscopic image and at least a portion of the three-dimensional model, the step of creating including blending the at least portion of the fluoroscopic image and the at least portion of the three-dimensional model according to the blending coefficient of step (b).

2. The system (100) of claim 1, wherein the act of creating the output image includes adjusting the fluoroscopic image including multiplying the value of the blending coefficient of step (b) with one of a greyscale value, a contrast value, and an intensity value for each pixel of the fluoroscopic image.

3. The system of claim 1, wherein each of the values of the blending coefficient can be adjusted via an input to the controller.

4. The system of claim 1, wherein the program instructions further include the steps of:
registering the image data of the fluoroscopic image in spatial relation with the image data of the three-dimensional model relative to a common coordinate system, and
wherein the calculating step (b) includes calculating values of the blending coefficients as a function of x and y coordinates of the common coordinate system.

5. The system of claim 4, wherein the program instructions further include the steps of:
identifying a target region of pixels of the fluoroscopic image comprising a plurality of pixels calculated with values of probability within a threshold probability of including image data of the object,
wherein the calculating step (b) includes identifying a first value of the blending coefficient for each pixel with the target region and a second blending coefficient for each pixel not within the target region, wherein the adjustment step (c) includes multiplying the first value of the blending coefficient with one of the greyscale value, the contrast value, or the intensity value of each pixel within the target region, and wherein the adjustment step includes multiplying the second value of the blending coefficient with one of the greyscale value, the contrast value, or the intensity value of each pixel of the fluoroscopic image outside the target region, the second blending coefficient less than the first blending coefficient.

6. The system of claim 1, wherein the value of the blending coefficient is between zero and one, and wherein the program instructions further include the steps of:
adjusting a two-dimensional illustration of the three-dimensional model including multiplying one minus the value of the blending coefficient of step (b) calculated per pixel having a particular (x,y) coordinate location, wherein one minus the value of the blending coefficient is multiplied by one of the greyscale value, the contrast value, and the intensity value of each respective pixel of the three-dimensional model having about a same (x, y) coordinate location as the respective pixel of the fluoroscopic image to be combined with in step (d).

7. The system of claim 1, identifying a plurality of values of blending coefficients of continuous transition between a first value of the blending coefficient calculated for a first pixel of the fluoroscopic image at a first coordinate (x1, y1) and a second value of the blending coefficient calculated for a second pixel of the fluoroscopic image at a second coordinate (x2, y2).

8. The system of claim 7, multiplying each of the plurality of values of blending coefficient of continuous transition by one of the greyscale value, the contrast value, or the intensity value of one of a plurality of pixels located between the first pixel and the second pixel of the fluoroscopic image.

9. The system of claim 8, wherein the plurality of values of blending coefficient of continuous transition is one of a continuous linear change and a continuous exponential change in value from the first value of the blending coefficient of the first pixel and the second value of the blending coefficient of the second pixel.

10. The system of claim 1, the program instructions further representative of the steps of:
calculating a value of a transparency per pixel of the three-dimensional model dependent on the probability calculated in step (a), and
adjusting the three-dimensional model according to the value of transparency calculated per pixel of the three-dimensional model.

11. A method to track movement of an object travelling through an imaged subject using a fluoroscopic imaging system, the method comprising the steps of:
a) calculating a probability that an acquired image data is of the object, the calculating step performed per pixel in a fluoroscopic image of the imaged subject;
b) calculating a value of a blending coefficient per pixel of the fluoroscopic image dependent on the probability calculated in step (a); and
c) creating an output image comprising at least a portion of the fluoroscopic image and at least a portion of the three-dimensional model, the step of creating including blending the at least portion of the fluoroscopic image and the at least portion of the three-dimensional model according to the blending coefficient of step (b).

12. The method of claim 11, wherein the act of creating the output image includes adjusting the fluoroscopic image including multiplying the value of the blending coefficient of step (b) with one of a greyscale value, a contrast value, and an intensity value for each pixel of the fluoroscopic image.

13. The method of claim 11, wherein the fluoroscopic image is updated periodically or continuously, and wherein the fluoroscopic image is updated in real-time with movement of the object through the imaged subject.

14. The method of claim 11, the method further including the steps of:
registering the image data of the fluoroscopic image in spatial relation with the image data of the three-dimensional model relative to a common coordinate system; and
identifying values of the blending coefficients as a function of x and y coordinates of the common coordinate system.

15. The method of claim 14, the method further including the steps of:
identifying a target region of pixels of the fluoroscopic image comprising a plurality of pixels calculated with values of the probability within a predetermined range of increased likelihood of including image data of the object,
wherein the calculating step (b) includes identifying a first value of the blending coefficient for each pixel with the target region and a second blending coefficient for each pixel not within the target region, wherein the adjustment step (c) includes multiplying the first value of the blending coefficient with one of the greyscale value, the contrast value, or the intensity value of each pixel within the target region, and wherein the adjustment step includes multiplying the second value of the blending coefficient with one of the greyscale value, the contrast value, or the intensity value of each pixel of the fluoroscopic image outside the target region, the second blending coefficient less than the first blending coefficient.

16. The method of claim 11, the method further including the steps of:
adjusting a two-dimensional illustration of the three-dimensional model including multiplying one minus the value of the blending coefficient of step (b) calculated per pixel having a particular (x,y) coordinate location, wherein one minus the value of the blending coefficient is multiplied by one of the greyscale value, the contrast value, and the intensity value of each respective pixel of the three-dimensional model having about a same (x,y) coordinate location as the respective pixel of the fluoroscopic image to be combined with in step (d).

17. The method of claim 11, the method further including the steps of identifying a plurality of values of blending coefficients of continuous transition between a first value of the blending coefficient calculated for a first pixel of the fluoroscopic image at a first coordinate (x1, y1) and a second value of the blending coefficient calculated for a second pixel of the fluoroscopic image at a second coordinate (x2, y2).

18. The method of claim 17, the method further including the step of multiplying each of the plurality of values of blending coefficient of continuous transition by one of the greyscale value, the contrast value, or the intensity value of one of a plurality of pixels located between the first pixel and the second pixel of the fluoroscopic image.

19. A system to track movement of an object through an imaged subject, comprising:
a fluoroscopic imaging system operable to acquire a fluoroscopic image of the object within a region of interest of the imaged subject;
an imaging system operable to create a three-dimensional model of the region of interest of the imaged subject; and
a controller comprising a memory operable to store a plurality of computer-readable program instructions for execution by a processor, the plurality of program instructions representative of the steps of:
a) calculating a probability that an acquired image data is of the object, the calculating step performed per pixel in the fluoroscopic image,
b) registering the fluoroscopic image and the three-dimensional of the region of the interest in spatial relation to a common coordinate system,
c) calculating a value of a transparency per pixel of the three-dimensional model dependent on the probability per respective pixel of the fluoroscopic image as calculated in step (a),
d) adjusting the three-dimensional model according to the value of transparency per pixel of step (c), and
e) combining the fluoroscopic image with the three-dimensional model adjusted according to step (d) to create an output image illustrative of the object in spatial relation to the three-dimensional model.

20. The system of claim 19, the program instructions further representative of the steps of:
identifying a target region of pixels of the fluoroscopic image comprising a plurality of pixels calculated with values of the probability within a predetermined range of increased likelihood of including image data of the object,
identifying a first value of the blending coefficient for each pixel with the target region and a second blending coefficient for each pixel not within the target region,
multiplying the first value of the blending coefficient with one of the greyscale value, the contrast value, or the intensity value of each pixel within the target region of the fluoroscopic image, and
multiplying the second value of the blending coefficient with one of the greyscale value, the contrast value, or the intensity value of each pixel of the fluoroscopic image outside the target region, the second blending coefficient less than the first blending coefficient.

* * * * *